United States Patent [19]

Bartram

[11] 4,276,328

[45] Jun. 30, 1981

[54] IMPREGNATION OF YARNS

[75] Inventor: David T. Bartram, Stockport, England

[73] Assignee: Ferodo Limited, Manchester, England

[21] Appl. No.: 89,636

[22] Filed: Oct. 29, 1979

[30] Foreign Application Priority Data

Nov. 4, 1978 [GB] United Kingdom ............... 43249/78

[51] Int. Cl.³ .................... B05D 3/02; D02G 3/00; B32B 25/00; B32B 27/00
[52] U.S. Cl. .................... 427/381; 427/389.8; 427/407.3; 428/375; 428/378; 428/382; 428/383
[58] Field of Search ............ 427/389.8, 381, 407.3; 428/375, 378, 382, 383, 436, 501, 524

[56] References Cited

U.S. PATENT DOCUMENTS

| | | | |
|---|---|---|---|
| 3,718,449 | 2/1973 | Fahey | 427/407.3 |
| 3,773,546 | 11/1973 | Marzocchi | 428/436 X |
| 3,897,588 | 7/1975 | Nohtomi | 428/436 |
| 3,955,036 | 5/1976 | Plueddemann | 428/429 |

*Primary Examiner*—Michael R. Lusignan
*Attorney, Agent, or Firm*—Cushman, Darby & Cushman

[57] ABSTRACT

A process for the treatment of glass yarn in which the yarn is impregnated with a low viscosity solution of a thermosetting binder in an organic solvent, the viscosity of said solution being not greater than 50 centipoise (=0.05 Pascal seconds) at 25° C.; solvent is then evaporated from the impregnated yarn; the yarn is further impregnated with a high viscosity solution of a thermosetting binder in an organic solvent; and solvent is again evaporated from the impregnated yarn. The process improves the properties of the glass yarn when used in the manufacture of glass reinforced composites.

3 Claims, No Drawings

IMPREGNATION OF YARNS

This invention relates to the treatment of yarn, and more particularly to the treatment of yarn comprising continuous glass filaments ('glass yarn') to fit it for use as reinforcement in composite articles, and specially for use as reinforcement in a matrix of thermoset plastics material, vulcanised rubber or like heat-cured material.

Composite articles, e.g. clutch facings, in which the reinforcement is asbestos yarn are made by impregnating the yarn with a liquid containing heat-curable material, such as an organic solvent solution of a thermosetting binder, for example a phenol-formaldehyde resin or a vulcanisable rubber or other elastomer. This solution may contain dissolved or suspended additives such as wearmodifiers and fillers. The impregnated yarn is treated to remove solvent from it, and then wound onto bobbins. For use it is unwound, shaped to the desired form, and heated to set the heat-curable material; and the composite article thus formed is then ground and machined to a desired surface finish.

In applying the procedure just described to the production of composite articles containing a reinforcement of glass yarn instead of asbestos yarn, we have found that the machined article has surfaces which are unpleasant to handle, because unimpregnated bundles of glass fibre originating in the centre of the yarn protrude from the machined surfaces.

The present invention is based on our discovery that the properties of glass yarn for incorporation in such articles are improved by a treatment carried out before the impregnation step referred to earlier. This preliminary treatment itself entails impregnating the glass yarn with a solution of thermosetting binder in an organic solvent, but the viscosity of this solution is made relatively low, in particular not greater than 50 centipoise (=0.05 Pascal seconds) at 25° C.; by contrast, the viscosity of the main impregnating solution is normally at least 500 centipoise. Solvent is then evaporated from the impregnated yarn, for example by passage through a heated oven or through a drying tower through which hot air is circulated. The dried yarn, its individual glass filaments now bound together as a result of the preliminary impregnation, is then further impregnated with main impregnating solution. Solvent is again evaporated from the impregnated yarn, which can then be wound on bobbins for storage, sale or immediate use.

Preferably, the viscosity of the solution employed in the preliminary impregnation is less than 30 cps. at 25° C.

Preferred solutions for the preliminary impregnation are solutions of a phenol-formaldehyde resin in a lower aliphatic alcohol or ketone, such as methanol, ethanol, isopropanol, acetone, methyl ethyl ketone or mixtures thereof. Particularly good results are obtained with the use of cashew-modified phenol-formaldehyde resins, for these leave the yarn surface in a desirably flexible condition.

The invention is further illustrated by the following Examples, in each of which the impregnating solutions were as follows:

SOLUTION A FOR PRELIMINARY IMPREGNATION

Thermosetting binder: Cashew-modified phenol formaldehyde resin, prepared from a mixture of cashew nut shell liquid and phenol in the molar proportions 1:12.6, and with formaldehyde: total phenol molar ratio 0.92:1, of:

solids content 54–56% by weight viscosity 110–140 centipoise at 25° C. cure time (test tube) 5 minutes at 150° C.

Solvent: Ethanol-methanol mixture known as 'Industrial Methylated Spirit', in an amount to give a viscosity suitable to the particular yarn under treatment in each Example (q.v.)

SOLUTION B FOR MAIN IMPREGNATION

| Solids | Parts by weight |
|---|---|
| Styrene-butadiene rubber | 21.4 |
| Mineral rubber (tackifier) | 4.1 |
| Coumarone-indene resin (tackifier) | 3.0 |
| Carbon black (reinforcer) | 18.1 |
| Phenol-formaldehyde resin powder (reinforcer) | 5.35 |
| Graphite powder (wear improver) | 6.1 |
| Barytes (wear improver) | 14.1 |
| Sulphur (vulcanising agent) | 10.5 |
| Litharge (vulcanising agent) | 22.7 |

Solvent: Naphtha (light petroleum of b.p. 130°–160° C.) in an amount such as to give a solution containing 40% solids by weight, viscosity about 1,000 centipoise (=1 Pascal second) at 25° C.

EXAMPLE 1

The yarn submitted to treatment had been produced thus: Four ends of commercially available 304 tex ECR 333 'E' glass strand (800 filaments per strand) were twisted together with a z-twist of 1.4 turns per inch (55.1 turns per meter). Two of the 4 ply yarns so produced were twisted together with S-twist of 1.0 turn per inch (39.4 turns per meter).

The yarn was passed through a bath containing solution A (2 volumes of resin: 3 volumes of solvent; viscosity at 20° C.=11.4 cps), and excess impregnant was removed by felt wipers. Impregnating solution remaining on the yarn ('pick up') was equivalent to an amount of solute forming 25% by weight of the initial yarn. The yarn was passed through an oven in which hot air circulated to evaporate solvent from it.

The yarn thus dried was passed through a bath containing solution B, and excess impregnant was removed as with solution A. Pick up of solution B solids was 16% by weight of the impregnated yarn entering the bath. After evaporation of solvent from the yarn it was wound onto bobbins.

For use, the yarn is unwound from its bobbin, rewound into a desired conformation, press-cured (10 minutes) in a closed die at 150° C., and baked (4 hours) at 180° C. between a pair of rigid plates. The cured article is then ground and machined.

EXAMPLE 2

The yarn submitted to treatment had been produced thus; One end of the E glass strand was given S twist of 1.0 turn per inch (=39.4 turns per meter), and two of the yarns thus obtained were twisted together with a Z-twist of 2.8 turns per inch (110.2 turns per meter). Four of these 2-ply yarns were then twisted together with 1 turn per inch (39.4 turns per meter) S-twist. Yarn treatment was carried out as in Example 1.

Pick up of solution A solids: 19% by weight

Pick up of solution B solids: 26% by weight

EXAMPLE 3

The yarn submitted to treatment had been produced thus:

Three ends of the E-glass strand were overfed onto two ends of the strand, and the whole was wrapped with a 10 tex nylon yarn at a frequency of 158 turns per meter to produce a yarn of about 1750 tex.

Yarn treatment was then carried out as in Example 1.

Pick up of solution A solids: 36% by weight
Pick up of solution B solids: 54% by weight

EXAMPLE 4

The yarn submitted to treatment had been produced thus:

One end of 500 tex staple glass sliver (average staple length 50 cm) was wrapped round 6 ends of the E-glass strand, and the whole was wrapped with a 10 tex nylon yarn at a frequency of 197 turns per meter.

Yarn treatment was as in Example 1, with the difference that solution A was made from 1 volume of resin and 3 volumes of solvent.

Pick up of solution A solids: 16% by weight
Pick up of solution B solids: 29% by weight

EXAMPLE 5

The yarn submitted to treatment had been produced thus:

Three ends of a 500 tex staple glass sliver (average staple length 50 cm) were wrapped with one end of 10 tex nylon yarn.

Yarn treatment was carried out as in Example 4.

Pick up of solution A: 61% by weight
Pick up of solution B: 82% by weight.

What we claim is:

1. A process for the treatment of yarn comprising continuous glass filaments, comprising the steps of:
   (1) impregnating the yarn with a low-viscosity solution of a phenol-formaldehyde resin in a lower aliphatic alcohol or ketone solvent, the viscosity of said solution being not greater than 50 centipoise at 25° C.;
   (2) evaporating solvent from the impregnated yarn;
   (3) further impregnating the yarn with a high viscosity solution of a thermosetting binder in an organic solvent, the viscosity of said solution being at least about 500 centipoise at 25° C.; and again
   (4) evaporating solvent from the thus-impregnated yarn.

2. A process according to claim 1, in which the phenol-formaldehyde resin is a cashew-modified resin.

3. A process according to claim 2, in which the cashew-modified phenol-formaldehyde resin is dissolved in a mixture of ethanol and methanol.

* * * * *